United States Patent [19]

Tims et al.

[11] 3,801,152

[45] Apr. 2, 1974

[54] UNIVERSALLY MOUNTABLE WINDSHIELD

[76] Inventors: Thomas William Tims, 7-Henry Corson Pl.; Robert Tudor Pemberton, 34 Wotten Way, both of Markham, Ontario, Canada

[22] Filed: May 5, 1972

[21] Appl. No.: 250,819

[52] U.S. Cl. .............................................. 296/78.1
[51] Int. Cl. ............................................ B62j 17/04
[58] Field of Search ..................... 296/78.1; 280/289

[56] References Cited
UNITED STATES PATENTS

| | | | |
|---|---|---|---|
| 2,589,993 | 3/1952 | Comiskey | 296/78.1 |
| 3,561,815 | 2/1971 | Stone | 296/78.1 |
| 2,675,266 | 4/1954 | Comiskey | 296/78.1 |

FOREIGN PATENTS OR APPLICATIONS

| | | | |
|---|---|---|---|
| 1,159,874 | 2/1958 | France | 296/78.1 |
| 701,934 | 6/1954 | Great Britain | 296/78.1 |
| 720,104 | 12/1954 | Great Britain | 296/78.1 |
| 733,208 | 6/1955 | Great Britain | 296/78.1 |

*Primary Examiner*—David Schonberg
*Assistant Examiner*—John A. Pekar

[57] ABSTRACT

A universally mountable windshield for bicycles, motorcycles or snowmobiles, having fastening means for attaching the windshield to the vehicle, comprising a spacer portion, clamp means at one end of the spacer portion and means adapted to secure the windshield at the other end of the spacer portion.

8 Claims, 4 Drawing Figures

PATENTED APR 2 1974 3,801,152

UNIVERSALLY MOUNTABLE WINDSHIELD

FIELD OF THE INVENTION

This invention relates to a windshield and in particular to a universally mountable windshield for use on bicycles, motorcycles, snowmobiles and the like, and means for mounting same.

BACKGROUND OF THE INVENTION

Although there have been many different windshields proposed for use on bicycles, motorcycles, snowmobiles and the like, no one shield has been provided which is universally mountable on all cycles, or snowmobiles, irrespective of the manufacturer of said vehicles. Indeed, there has been no windshield to date, which utilizes a simple means for mounting, that will be both simple to utilize, easily packaged and displayed, and economical, while at the same time, providing a windshield with the stability and safety, required and expected.

It is therefore an object of the invention to provide a windshield with the above characteristics.

It is a further object to provide a means for mounting said windshield which securely fastens said shield to said aforementioned vehicles while at the same time being economical.

The above and other objects and features of advantages of this invention will appear from the following summary and more detailed description thereof.

SUMMARY OF THE INVENTION

According to the present invention, a windshield having the above characteristics is provided, comprising a sheet of transparent material of predetermined shape and size, which may be attached to, for example, the handlebars of a cycle or smowmobile by fastening means in a manner as will hereinafter be described. Further the sheet of transparent material may be mounted at its base in a stable supporting means, and the combination may thereafter be attached in the above-indicated manner.

BRIEF DESCRIPTION OF THE DRAWINGS

The invention will be more fully understood from the following detailed description in which references may be had to the accompanying illustrative drawings, wherein.

DETAILED DESCRIPTION OF THE INVENTION

Figure 1:
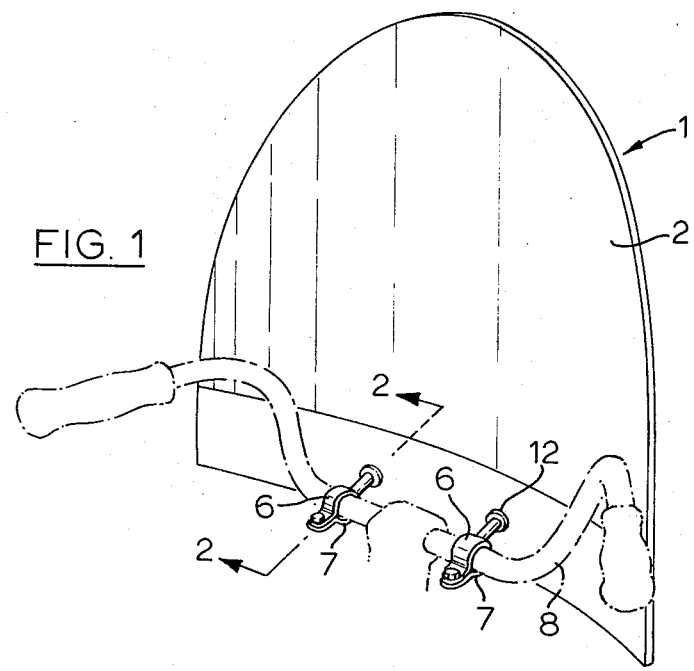
FIG. 1 is a rear elevation of a windshield constructed according to a first embodiment of the invention attached to handlebars.

This invention provides a windshield 1 comprising a sheet of transparent material 2 which in a first embodiment illustrated in FIGS. 1 and 2 has at least two apertures 3, therein in spaced relation for insertion therethrough of fastening means 6, one for each aperture 3, as will hereinafter be described, which secures said sheet 2 to the handlebars 8 of a cycle, snowmobile or the like. To reinforce each aperture 3 a raised boss 31 illustrated in FIG. 2, or raised bosses 31 and 32 illustrated in a second embodiment in FIG. 3, may be disposed about the periphery, through, and at one or both ends of each aperture 3, respectively, either being molded as an integral part thereof or fastened to said sheet subsequent to the manufacture in any suitable manner known in the art, for example, heat sealing.

The invention further provides that the sheet of transparent material may be mounted in support means, for example in a channel of said support means or other suitable manner; said support means having at least two apertures therein in spaced relation for insertion therethrough of fastening means 6, one for each aperture. For example, in a third embodiment of the invention, illustrated in FIG. 4, transparent sheet 2 is mounted in support means 4 such that the two apertures 3 in said sheet register with the two apertures 5 of the support means 4, said support means including two parallel equilength walls 19 and 11, wall 19 being disposed higher than wall 11 for increased support and wind stability, separated a predetermined distance, i.e. the thickness of the transparent sheet 2 between which said sheet is securely inserted. In addition, wind resistance may be reduced if transparent sheet 2 is curved or both transparent sheet 2 and support means 4 in which it is mounted, are curved.

Figure 2:
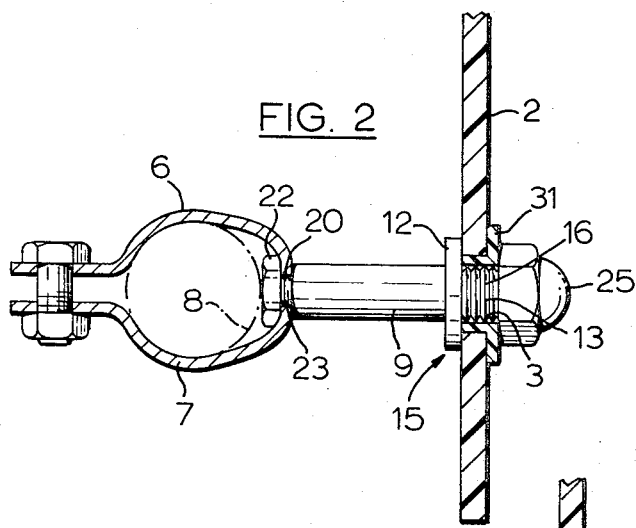
FIG. 2 is a cross-sectional view taken along the line 2—2 in FIG. 1.
Figure 3:
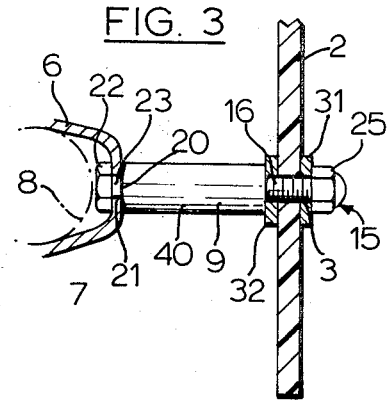
FIG. 3 is a cross-sectional view of a second embodiment of the invention taken along the line 2—2 as in FIG. 1.
Figure 4:
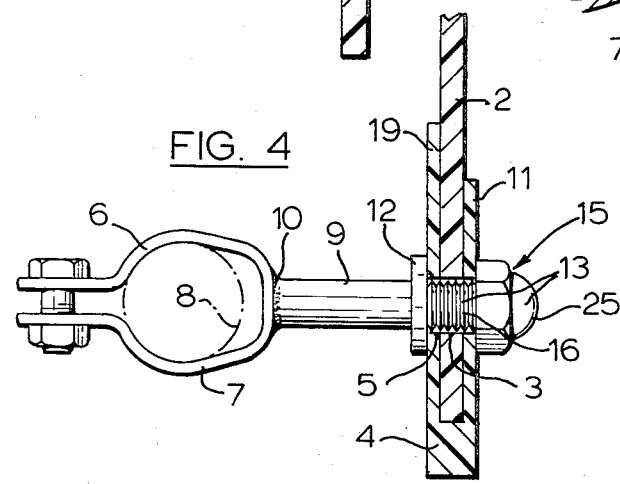
FIG. 4 is a cross-sectional view of a third embodiment of the invention taken along the line 2—2 as in FIG. 1.

Fastening means 6 provided by this invention permitting ease of assembly and mounting of the shield, while at the same time providing stability at minimal cost, comprises clamp means 7, which is secured to handlebars 8, and extension means 9 of predetermined length, said predetermined length dependent upon the configuration of the vehicle's handlebars to which the windshield is to be attached, which may be attached to clamp means 7 at 10 by, for example, spot welding illustrated in FIG. 4, or fastened, as illustrated in FIGS. 2 and 3, through said clamp means at 20 through aperture 21 by mating a threaded nut 22 to threaded end 23 of said extension means. The opposed end of extension means 9 may be utilized for insertion through apertures 3 when the shield comprises transparent sheet 2 alone, illustrated in FIGS. 2 and 3, and through registering apertures 3 and 5 of said transparent sheet 2 and said support means 4 respectively, illustrated in FIG. 4, when said shield comprises transparent sheet 2 and support means 4, to secure transparent sheet 2 alone or when mounted in support means 4 in a generally upright position in a preferred and unique manner as hereinafter described. Windshield securing means 15 is disposed at one end of extension means 9 to secure and support said windshield 1. In the emobdiments of the invention illustrated in FIGS. 2 and 4, windshield securing means 15 comprises shoulder formation 12 and securing means 13, shoulder formation 12 disposed nearer clamp means 7 than securing means 13 by a distance about the thickness of, in FIG. 2, transparent sheet 2, and in FIG. 4, support means 4 to maintain the shield 1 a fixed distance from clamp means 7 in a generally upright position, securing means 13 comprising, for example, nut means 25 internally threaded, mated to the threaded end portion 16 of extension means 9, although any securing means used at 13 known in the art is satisfactory, for example, a pin inserted through an aperture, or the threaded end 16 may be removed and a threaded recess inserted in the face of resultant extension means 9 at the point where threaded end 16 was removed to mate with a bolt inserted through apertures 3 as in FIGS. 2 and 3 or apertures 3 and 5 as in FIG. 4, to be screwed into said threaded recess, to secure said windshield in intimate contact with said shoulder formation 12.

Extension means 9, in addition to being attached to clamp means 7 in different ways, may be modified (eliminating shoulder formation 12) by increasing the cross-sectional area of that portion of extension means 9 between clamp means 7 and threaded end 16, for example, illustated in FIG. 3 as spacer portion 40, so that windshield securing means 15 comprises spacer portion 40 and securing means 13, which may comprise the examples illustrated above or any such further satisfactory means known in the art, portion 40 being in effect a modified shoulder formation 12.

For durability the transparent sheet may comprise a transparent plastic or other suitable polymeric material as, for example, polycarbonate or cellulose acetate butyrate being, under normal conditions, shatterproof, as may the support means, and fastening means though they may comprise any suitable material such as, for example, steel.

As many changes may be in the construction without departing from the scope of the invention, it is intended that all matter contained in the above description or shown in the accompanying drawings shall be interpreted as illustrative only and not in a limiting sense.

What we claim is:

1. In combination a windshield comprising a sheet of transparent material of predetermined shape and size having at least two apertures therethrough in spaced relation and a plurality of fastening means corresponding to the number of said apertures, to be inserted through said apertures, each fastening means comprising extension means of predetermined length, clamp means secured to one end thereof, and windshield securing means to the other end thereof, said windshield securing means comprising a shoulder formation disposed generally at right angles to and proximate one end of, said extension means, and of greater cross-sectional area than the cross-sectional area of said extension means proximate said shoulder formation, and against which shoulder formation said shield abuts when said shield is secured to the end of said extension means, and means at the end of said extension means to secure said shield in contact with said shoulder formation and maintain it generally upright a predetermined distance from said clamp means, said extension means and said shoulder formation being integrally formed, said clamp means comprising a single length of material joined at the ends thereof by means secured through aligned apertures disposed proximate said ends to tighten said clamp means about the surface of a handle-bar and to secure it thereto, whereby said extension means is distinct from said means secured through said apertures disposed proximate said ends.

2. The combination of claim 1 wherein said means secured through aligned apertures disposed proximate said ends to tighten said clamp means comprises means threaded to receive and secure a nut thereon thereby tightening the clamp means, and a nut, and said means at the end of said extension to secure said shield in contact with said shoulder formation comprises the end of said extension means threaded to receive a nut threaded thereon and a nut.

3. The combination as claimed in claim 2 wherein said extension means, the junction of the clamp means and extension means and the joined ends of the single length of material of the clamp means are aligned.

4. The combination as claimed in claim 1 further including a pair of parallel equilength walls separated a predetermined distance and joined one to the other at their base to form a track therebetween into which said shield is inserted and secured in intimate contact with the inner surface of each of said walls, said walls each having apertures therethrough to register with said apertures in said shield when said shield is mounted in said track.

5. The combination as claimed in claim 4 wherein the wall of said pair of parallel equilength walls abutting said shoulder formation, when said fastening means is secured through said registered apertures in said parallel equilength walls and said shield, is higher.

6. The combination of claim 4 wherein said shield comprises the polymeric material, polycarbonate.

7. The combination as claimed in claim 1 wherein said fastening means comprises a polymeric material.

8. The combination of claim 1 wherein said shield comprises the polymeric material, polycarbonate.

* * * * *